United States Patent
Jalaldeen et al.

(10) Patent No.: US 9,342,966 B2
(45) Date of Patent: May 17, 2016

(54) DETERMINING A RESTRICTED APPARATUS WITH RESPECT TO A LOCATION

(71) Applicant: INTERNATIONAL BUSINESS MACHINES CORPORATION, Armonk, NY (US)

(72) Inventors: Ahamed Jalaldeen, Bangalore (IN); Shihabudheen V. Kavungathodika, Malappuram (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/499,369

(22) Filed: Sep. 29, 2014

(65) Prior Publication Data
US 2016/0093174 A1   Mar. 31, 2016

(51) Int. Cl.
  H04W 24/00 (2009.01)
  G08B 5/22 (2006.01)
  H04W 4/02 (2009.01)
  H04B 5/00 (2006.01)
(52) U.S. Cl.
  CPC .............. *G08B 5/229* (2013.01); *H04B 5/0062* (2013.01); *H04W 4/02* (2013.01)
(58) Field of Classification Search
  CPC ......................... H04M 2242/30; H04M 3/2281
  USPC ........ 455/414.1, 406, 417, 418, 456.1, 456.3, 455/567; 340/439, 5.84
  See application file for complete search history.

(56) References Cited

U.S. PATENT DOCUMENTS

| | | |
|---|---|---|
| 6,415,542 B1 | 7/2002 | Bates et al. |
| 8,584,388 B1 | 11/2013 | Fujisaki |
| 2008/0106405 A1 | 5/2008 | Zanovitch |
| 2010/0315235 A1 | 12/2010 | Adegoke et al. |
| 2013/0150004 A1* | 6/2013 | Rosen ..................... H04W 8/22 455/414.1 |

OTHER PUBLICATIONS

Konopacki, Larry; Carrying and Possessing Firearms in Wisconsin; Wisconsin Legislative Council Information Memorandum; IM-2011-10; Jul. 1, 2011; 8 pages.

Cleary, Jim; Firearms in Minnesota: Prohibited Locations; Information Brief, Research Department, Minnesota House of Representatives; Oct. 2011; 6 pages.

Texas State Penal Code, Chapter 46. Weapons; Retrieved from the Internet on Jul. 9, 2014; URL: http://www.statutes.legis.state.tx.us/Docs/PE/htm/PE.46.htm; 24 pages.

(Continued)

*Primary Examiner* — Kiet Doan
(74) *Attorney, Agent, or Firm* — Schmeiser, Olsen & Watts; John Pivnichny

(57) ABSTRACT

A method and system for determining restricted apparatuses with respect to a location is provided. The method includes determining that a user is in possession of a restricted apparatus. A video based process and a global positioning system (GPS) based process is executed with respect to the restricted apparatus and a location associated with a user. Restrictions associated with the restricted apparatus with respect to the location associated with the user are determined based on results of the video based process and the GPS based process. The restrictions are presented to the user.

17 Claims, 6 Drawing Sheets

By Location Type:

| Location Type | Country | State | County | Article/Item | Distance | Status |
|---|---|---|---|---|---|---|
| Courthouse | USA | All | All | Cell Phone | 0 | Prohibited |
| Airport | USA | All | All | Spray Paint | 0 | Prohibited |
| Place of Worship | USA | All | All | Pestecides | 0 | Prohibited |
| Hospital | USA | All | All | Restricted Beverage | 0 | Prohibited |
| Amtrak | USA | All | All | Protection Device | 0 | Prohibited |

400

By Street Address:

| Street Address | Country | State | County | Article/Item | Distance | Status |
|---|---|---|---|---|---|---|
| 5Main Street | USA | All | All | Camera | 0 | Prohibited |
| 8 Broadway | USA | All | All | Lighter | 0 | Prohibited |

404

(56) References Cited

OTHER PUBLICATIONS

Washington State Legislature; RCW 9.41.300; Weapons prohibited in certain places—Local laws and ordinances—Exceptions—Penalty; Retrieved from the Internet Jul. 9, 2014; URL: http://apps.leg.wa.gov/rcw/default.aspx?cite=9.41.300; 4 pages.

Oregon Firearms Federation; Prohibited Places; Retrieved from the Internet Jul. 9, 2014; URL: http://www.oregonfireamrs.org/chl-central/phoribited-places; 5 pages.

Michigan State Police; Pistol Free Areas; Retrieved from the Internet Jul. 9, 2014; URL: http://www.michigan.gov/msp/0,4643,7-123-1591_3503_4654-10947--,00.html; 3 pages.

U.S. Law Shield; Florida Gun Law—Where Can I Have a Gun?; Retrieved from the Internet Jul. 9, 2014; URL: https://www.uslawshield.com/forida-gun-law/; 8 pages.

ATF Homepage; Retrieved from the Internet Jul. 9, 2014; URL: http://www.atf.gov; 1 page.

* cited by examiner

By Location Type:

| Location Type | Country | State | County | Article/Item | Distance | Status |
|---|---|---|---|---|---|---|
| Courthouse | USA | All | All | Cell Phone | 0 | Prohibited |
| Airport | USA | All | All | Spray Paint | 0 | Prohibited |
| Place of Worship | USA | All | All | Pestecides | 0 | Prohibited |
| Hospital | USA | All | All | Restricted Beverage | 0 | Prohibited |
| Amtrak | USA | All | All | Protection Device | 0 | Prohibited |

FIG. 4A

By Street Address:

| Street Address | Country | State | County | Article/Item | Distance | Status |
|---|---|---|---|---|---|---|
| 5Main Street | USA | All | All | Camera | 0 | Prohibited |
| 8 Broadway | USA | All | All | Lighter | 0 | Prohibited |

FIG. 4B

DETERMINING A RESTRICTED APPARATUS WITH RESPECT TO A LOCATION

FIELD

The present invention relates generally to a method for determining a restricted apparatus with respect to a location and in particular to a method and associated system for alerting a user in response to the determination.

BACKGROUND

Determining prohibited items typically includes an inaccurate process with little flexibility. Communicating the prohibited item to a user may include a complicated process that may be time consuming and require a large amount of resources. Accordingly, there exists a need in the art to overcome at least some of the deficiencies and limitations described herein above.

SUMMARY

A first aspect of the invention provides a method comprising: determining, by a computer processor of a computing system, that a user is in possession of a restricted apparatus; executing, by the computer processor, a video based process associated with the restricted apparatus and a location associated with the user; executing, by the computer processor, a global positioning system (GPS) based process associated with the restricted apparatus and the location associated with the user; determining, by the computer processor based on results of the video based process and the GPS based process, restrictions associated with the restricted apparatus with respect to the location associated with the user; and presenting, by the computer processor, the restrictions to the user.

A second aspect of the invention provides a computing system comprising a computer processor coupled to a computer-readable memory unit, the memory unit comprising instructions that when executed by the computer processor implements a method comprising:
determining, by the computer processor, that a user is in possession of a restricted apparatus; executing, by the computer processor, a video based process associated with the restricted apparatus and a location associated with the user; executing, by the computer processor, a GPS based process associated with the restricted apparatus and the location associated with the user; determining, by the computer processor based on results of the video based process and the GPS based process, restrictions associated with the restricted apparatus with respect to the location associated with the user; and presenting, by the computer processor, the restrictions to the user.

A third aspect of the invention provides a computer program product, comprising a computer readable hardware storage device storing a computer readable program code, the computer readable program code comprising an algorithm that when executed by a computer processor of a computing system implements a method, the method comprising: determining, by the computer processor, that a user is in possession of a restricted apparatus; executing, by the computer processor, a video based process associated with the restricted apparatus and a location associated with the user; executing, by the computer processor, a GPS based process associated with the restricted apparatus and the location associated with the user; determining, by the computer processor based on results of the video based process and the GPS based process, restrictions associated with the restricted apparatus with respect to the location associated with the user; and presenting, by the computer processor, the restrictions to the user.

The present invention advantageously provides a simple method and associated system capable of determining prohibited items.

BRIEF DESCRIPTION OF THE DRAWINGS

FIG. 3, including

FIGS. 4A and 4B illustrate example restriction tables, in accordance with embodiments of the present invention.

DETAILED DESCRIPTION

Figure 1:
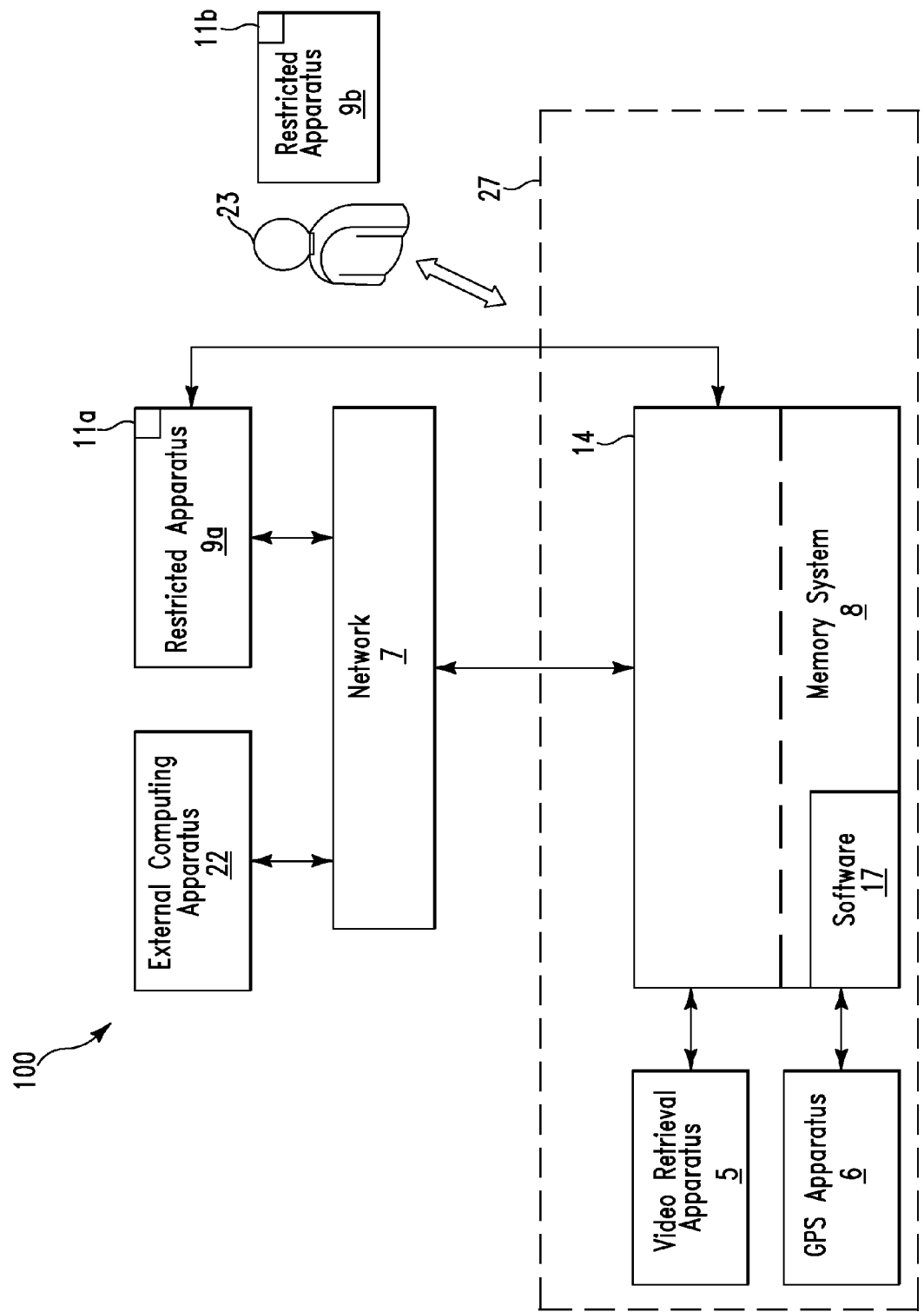
FIG. 1 illustrates a system for enabling a process for determining a restricted apparatus with respect to a specified location, in accordance with embodiments of the present invention.

FIG. 1 illustrates a system 100 for enabling a process for determining restrictions of a restricted apparatus with respect to a specified location, in accordance with embodiments of the present invention. Federal, state, and county laws may prohibit a person carrying one or more specified apparatuses in their possession with respect to specified location types. The specified location types and restricted apparatuses may vary across countries, states, and counties and may vary over time. Additionally, specified locations of restricted location types may have additional restrictions for carrying specific sets apparatuses in their premises. System 100 enables a process for automatically detecting restricted apparatuses with respect to locations and alerting a user 23.

System 100 of FIG. 1 includes a computing system 27 (comprising a video retrieval apparatus 5 and a global positioning system (GPS) enabled apparatus 6 connected to a computing apparatus 14), an external computing system 22, a network 7, and restricted apparatuses 9a and/or 9b. GPS enabled apparatus 6 may include standard GPS systems or assisted GPS (AGPS) systems. Computing system 27 may be an eyewear apparatus comprising video retrieval apparatus 5, GPS enabled apparatus 6, and computing apparatus 14. An eyewear apparatus is defined herein as a technology (e.g., an eyewear gadget, an eyewear device, a wearable eyewear device, etc.) comprising an optical eyewear mounted display for displaying information and/or images (i.e., superimposed over an actual view of a user) in a hands-free format. Users of the eyewear apparatus may communicate with the Internet via natural language voice commands. Alternatively, video retrieval apparatus 5, GPS enabled apparatus 6, and computing apparatus 14 may each comprise independent components that form computing system 27. Restricted apparatus 9a may be connected through a network 7 to computing system 14. Alternatively, restricted apparatus 9a may be directly connected to computing system 14. Restricted apparatuses 9a and/or 9b may each comprise an RFID tag 11a and 11b, respectively. Network 7 may include any type of network including, inter alia, a local area network, (LAN), a wide area network (WAN), the Internet, a wireless network, etc. Video retrieval apparatus 5 may include any type of video apparatus including, inter alia, a video retrieval device, a video camera for retrieving still photos or a video stream, etc. The video camera may comprise an independent unit. Alternatively, the video camera may be comprised by another apparatus such as, inter alia, computing system 27, a smart phone, a tablet, a PDA, etc. The GPS enabled apparatus 5 may comprise any type of GPS enabled apparatus such as, inter alia, a portion of computing system 27, a smart phone, etc. Restricted apparatus 9a may comprise any type of apparatus or item connectable to computing system 14 (i.e., via network 7 or directly connected). Restricted apparatus 9b may comprise any type of apparatus or item that is not connected to computing system 14. Restricted apparatuses 9a and/or 9b may comprise any type of apparatus or item (possessed by a user 23) that may be restricted based on a location including, inter alia, a cell phone, spray paint, pesticides, prohibited beverage, a camera, a lighter, a tool, a protection apparatus, cigarettes, etc. Computing apparatus 14 includes a CPU and a memory system 8. Memory system 8 may include a single memory system. Alternatively, memory system 8 may include a plurality of memory systems. Memory system 8 includes software 17. Computing apparatus 14 may (internally) perform all processing with respect to determining restrictions of a restricted apparatus with respect to a specified location (e.g., with respect to execution of the algorithms of FIGS. 2 and 3). Alternatively, computing apparatus 14 in combination with external computing system(s) 22 may perform processing with respect to determining restrictions of a restricted apparatus with respect to a specified location (e.g., with respect to execution of the algorithms of FIGS. 2 and 3). For example, external computing system(s) 22 may provide input data while computing apparatus 14 performs processing and provides a warning or external computing system(s) 22 may provide portions of processing while computing apparatus 14 performs additional processing and provides a warning.

System 100 enables a process to enforce restrictions with respect to carrying restricted articles/items in certain location types. System 100 additionally enables a process to protect users from executing violations with respect to restricted articles/items in accordance with federal, state, and county laws.

System 100 enables a process for determining a restricted apparatus with respect to a specified location as follows:

1. A location specific restrictions data store (e.g., restriction tables as described with respect to FIGS. 4A and 4B, infra) is generated for various restricted apparatuses. The location specific restrictions data store may be used by and stored within computing apparatus 14 and/or external computing system(s) 22. Computing apparatus 14 may be periodically synchronized with the data (e.g., updated restriction tables) from external computing systems (e.g., external computing system(s) 22).
2. Restricted apparatuses in possession of user 23 are detected via a low frequency based search apparatus such as, inter alia, an RFID system or vicinity card reader. Alternatively, restricted articles/items in possession of user 23 may detected via user-defined configuration stored within computing apparatus 14 and/or external computing system(s) 22 (and/or restricted apparatus 9a).
3. Possession of the restricted apparatuses 9a and/or 9b (i.e., in possession by user 23) in a specific proximity to a specified location is verified. The specified location (restricting one or more items in possession of user 23) is identified using from GPS data (retrieved from GPS apparatus 6 and/or a restrictions data store) and video data (retrieved from video retrieval apparatus 5).
4. User 23 is alerted (of possession of the restricted apparatuses 9a and/or 9b) while entering the specified location.

Figure 2:
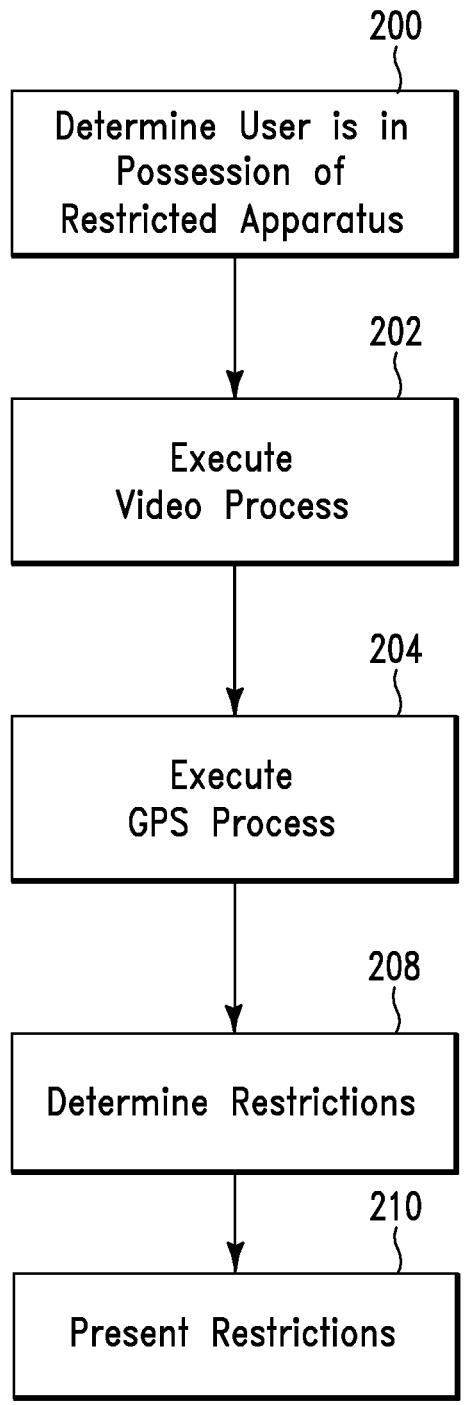
FIG. 2 illustrates an algorithm detailing a process flow enabled by the system of FIG. 1 for determining a restricted apparatus with respect to a specified location, in accordance with embodiments of the present invention.

FIG. 2 illustrates an algorithm detailing a process flow enabled by system 100 of FIG. 1 for determining restrictions of a restricted apparatus with respect to a specified location, in accordance with embodiments of the present invention. Each of the steps in the algorithm of FIG. 2 may be enabled and executed in any order by a computer processor executing computer code. In step 200, it is determined that a user is in possession of a restricted apparatus (e.g., via an RFID tag process or user defined configuration data). In step 202, a video based process associated with the restricted apparatus and a location associated with the user. The video based process may include the following steps:

1. Determining that a video retrieval apparatus (e.g., of a eyewear apparatus) is enabled.
2. Retrieving (from a video retrieval apparatus) video data associated with the location (i.e., a current location) associated with the user. The video data may include, inter alia, a sign comprising text defining the restrictions, a sign comprising a visual indicator defining the restrictions, a sign comprising text and a visual indicator defining the restrictions, etc to carry one or more restricted apparatuses.
3. The video data is analyzed.

In step 204, a GPS based process associated with the restricted apparatus and the location associated with the user is executed. The GPS based process may include the following steps:

1. Retrieving (from a GPS apparatus of a eyewear apparatus) GPS data defining the location associated with the user.
2. Determining (based on the GPS data) geographical attributes associated with the location (i.e., a current location).
3. The restricted apparatus is analyzed with respect to restrictions data associated with the geographical attributes.
4. Data is located (within a restrictions data store). The data defines the restricted apparatus with respect to restrictions (as described with respect to step 208, infra) and the location.

In step 208, restrictions associated the said restricted apparatus with respect to the location associated with the user are determined based on results of the video based process and the GPS based process. In step 210, the restrictions are presented to the user. The restrictions may be presented via a visual indication, audible indication, or vibration indication specifying the restrictions.

Figure 3A:
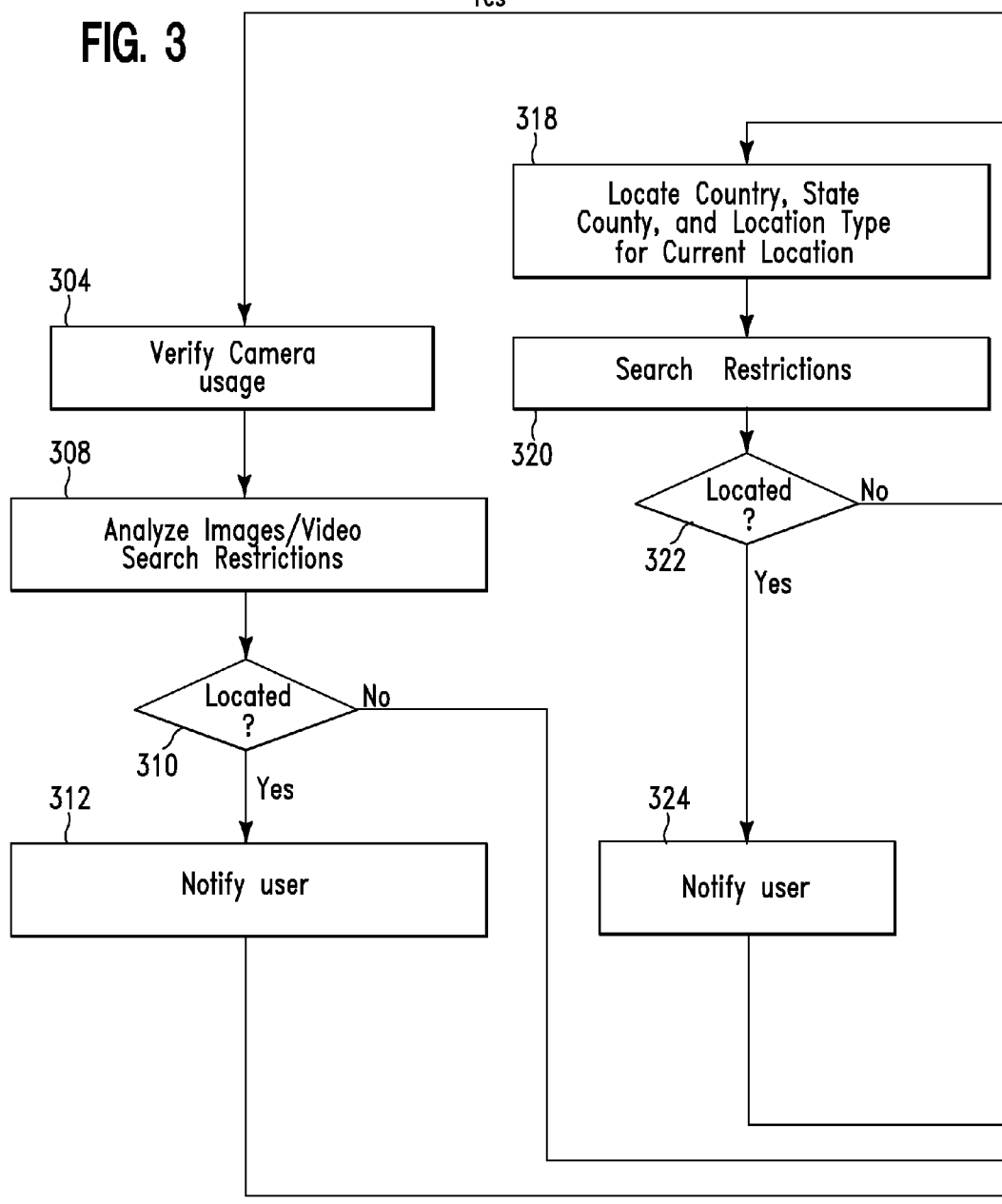
FIGS. 3A and 3B, illustrates an algorithm detailing an implementation example enabled by the system of FIG. 1 for determining a restricted apparatus with respect to a specified location, in accordance with embodiments of the present invention.
Figure 3B:
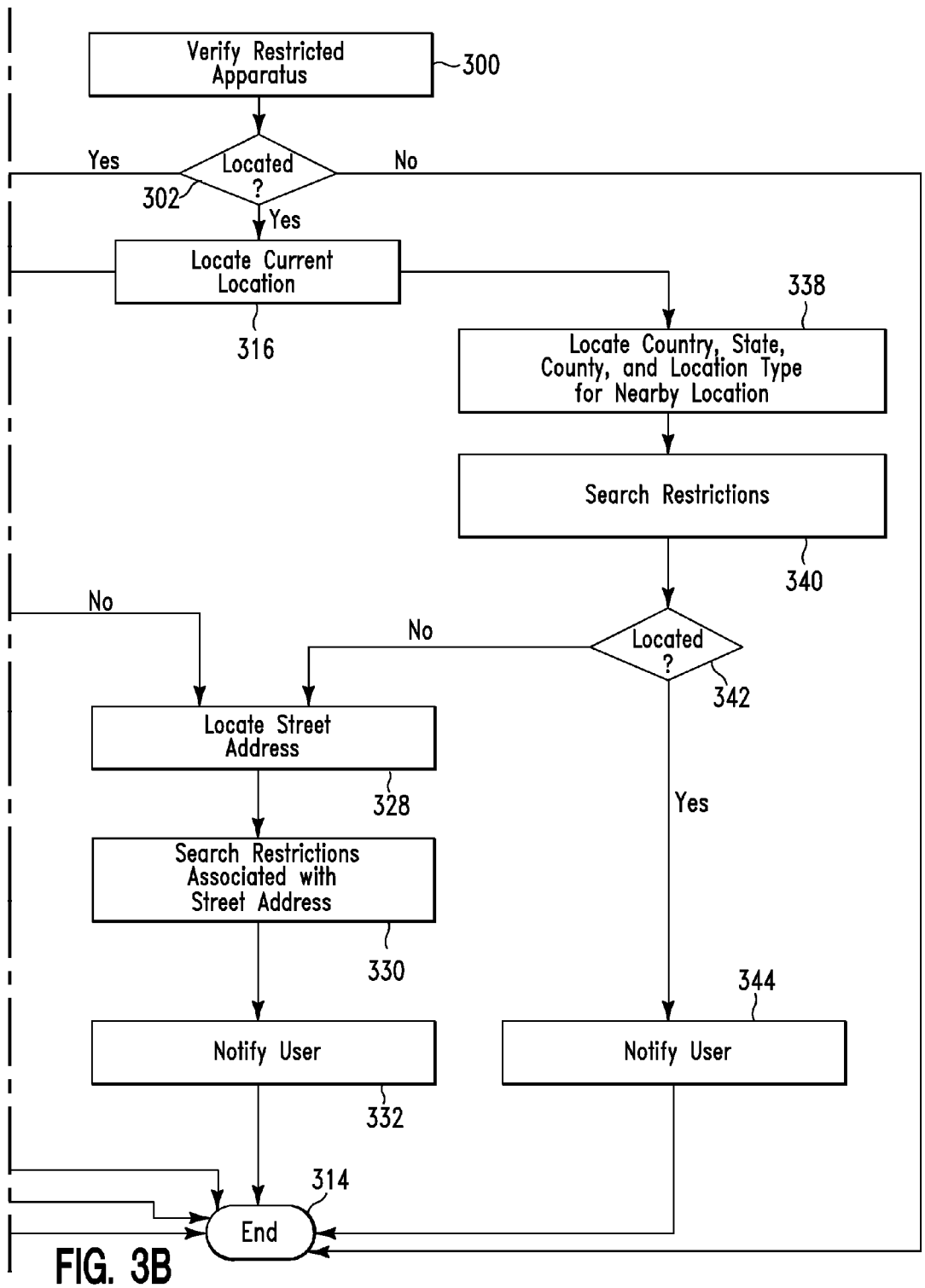

FIG. 3, including FIGS. 3A and 3B, illustrates a detailed algorithm describing an implementation example and further detailing the algorithm of FIG. 2, in accordance with embodiments of the present invention. Each of the steps in the algorithm of FIG. 3 may be enabled and executed in any order by a computer processor executing computer code. In step 300, the system (e.g., system 100 of FIG. 1) verifies restricted articles (e.g., restricted apparatus 9a and/or 9b) in possession by a user. The system may use a low frequency based search mechanism such as an RFID/vicinity card system or a user-defined configuration stored within eyewear gadgets, cell phones, an electronic gadget, etc. in order to verify the existence of restricted articles in possession by the user in a predefined and/or configurable proximity of the user. In step 302, it is determined if the restricted article is in close proximity to the user. If in step 302, it is determined that the restricted article is not in close proximity to the user, then the process is terminated in step 314. If in step 302, it is determined that the restricted article is in close proximity to the user, then the system executes parallel processes with respect video inputs (initiated in step 304) and GPS inputs (initiated in step 316).

In step 304, the system verifies that a video retrieval apparatus (e.g., of an eyewear apparatus) is being currently used by the user. For example, the system may verify that a camera within an eyewear apparatus is currently enabled by the user with respect to taking photographs or recording videos. In step 308, the system analyzes camera images/videos with respect to detected signs and/or text presenting prohibited restricted articles in possession by the user. In step 310, the system determines (based on results of the analysis of step 308) if there are any notifications (e.g., signs, text, etc.) associated with restricted articles in possession by the user. If in step 310, the system determines that there are notifications associated with restricted articles in possession by the user then in step 312, the system notifies the user of the sign and/or text prohibiting the restricted articles in possession by the user and the process is terminated in step 314. If in step 310, the system determines that there are no notifications associated with restricted articles in possession by the user then the process is terminated in step 314.

In step 316, the system locates a current location of the user via a GPS apparatus. In step 318, the system locates (from GPS data retrieved from the GPS apparatus) a country, state, county, and location type for the current location of the user. In step 320 (for each restricted article in possession by the user), the system analyzes a restrictions table (e.g., restriction tables of FIGS. 4A and 4B as described, infra) with respect to the country, state, county, and location type. In step 322, it is determined if one or more associated entries are located in the restrictions table. If in step 322, it is determined that associated entries are located in the restrictions table then in step 324, the system notifies the user of the restriction of the current location with respect to carrying one or more restricted articles in possession by the user. If in step 322, it is determined that one or more associated entries are not located in the restrictions table then step 328 is executed as described, infra.

In step 338, the system locates (from GPS data retrieved from the GPS apparatus) a country, state, county, and location type for a near-by location (i.e., with respect to the current location) of the user. In step 340 (for each restricted article in possession by the user), the system analyzes a restrictions table (e.g., restriction tables of FIGS. 4A and 4B as described, infra) with respect to the country, state, county, and location type of the near-by location. In step 342, it is determined if one or more associated entries are located in the restrictions table. If in step 342, it is determined that one or more associated entries are located in the restrictions table then in step 344, the system notifies the user of the restriction of the near-by location with respect to carrying one or more restricted articles in possession by the user. If in step 342, it is determined that one or more associated entries are not located in the restrictions table then step 328 is executed.

In step 328, the system locates a street address for the current location of the user from GPS data. In step 330 (i.e., for each restricted article in possession by the user) the system analyzes a restrictions table with respect to the street address. In step 332, it is determined that a restriction with respect to the street address has been located and in response, the system notifies the user of the restriction in the street address with respect to carrying one or more restricted articles in possession by the user and the process is terminated in step 314.

FIGS. 4A and 4B illustrate example restriction tables 400 and 404, in accordance with embodiments of the present invention. FIG. 4A illustrates a restriction table 400 describing restrictions for items determined by a location type. FIG. 4B illustrates a restriction table 404 describing restrictions for items determined by a street address.

Figure 5:
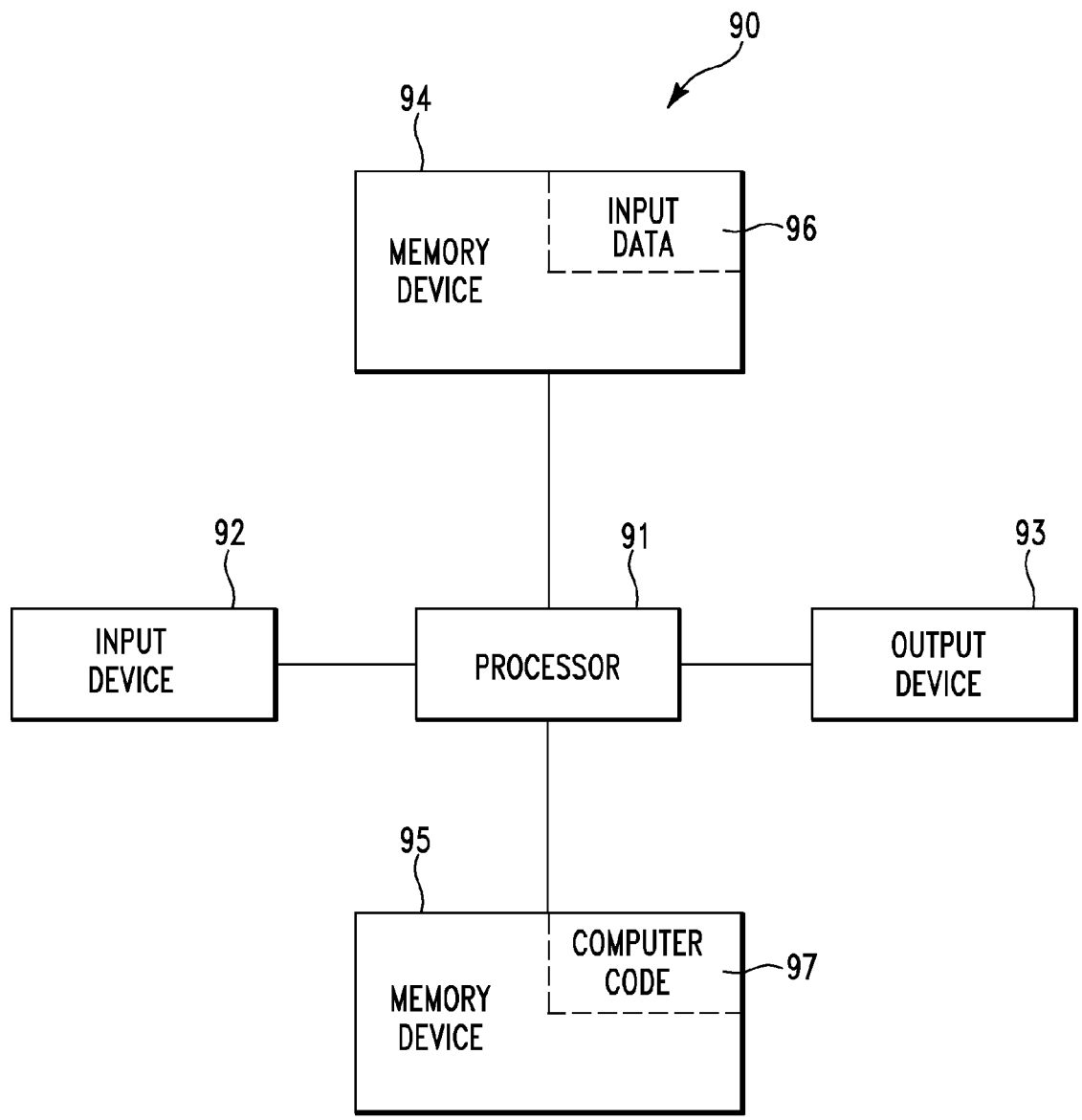
FIG. 5 illustrates a computer system used by the system of FIG. 1 for enabling a process for determining a restricted apparatus with respect to a specified location, in accordance with embodiments of the present invention.

FIG. 5 illustrates a computer system 90 (e.g., computer apparatus 14 and/or external computing system(s) of FIG. 1) used by or comprised by the system of FIG. 1 for enabling a process for determining restrictions of a restricted apparatus with respect to a specified location, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 (e.g., computing system 27 and/or 14 of FIG. 1) includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling a process for determining restrictions of a restricted apparatus with respect to a specified location. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to determine restrictions of a restricted apparatus with respect to a specified location. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for determining restrictions of a restricted apparatus with respect to a specified location. In another embodiment, the invention provides a business method that performs the process steps of the invention on a subscription, advertising, and/or fee basis. That is, a service supplier, such as a Solution Integrator, could offer to enable a process for determining restrictions of a restricted apparatus with respect to a specified location. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
    determining, by a computer processor of an eyewear based computing system, that a user is in possession of a restricted apparatus restricted based on a specified geographical location, wherein said eyewear based computing system comprises an optical eyewear mounted display used by said user for displaying information and images to said user, and wherein said eyewear based computing system comprises a video retrieval apparatus and global positioning system (GPS) apparatus internal to said eyewear based computing system;
    executing, by said computer processor via said video retrieval apparatus, a video based process associated with said restricted apparatus and a location associated with said user,
    wherein said executing said video based process comprises:
    determining that said video retrieval apparatus is enabled;
    retrieving, from said video retrieval apparatus, video data associated with said location associated with said user, wherein said location comprises a current geographical location of said user;
    analyzing said video data; and
    generating, based on results of said analyzing, a visual indication specifying general restrictions associated with said location, wherein said visual indication is derived from a visual sign, at said location, presenting said general restrictions;
    executing, by said computer processor via said GPS apparatus, a GPS based process associated with said restricted apparatus and said location associated with said user;
    determining, by said computer processor based on results of said video based process and said GPS based process, specified restrictions associated with said restricted apparatus with respect to said location associated with said user; and
    presenting, by said computer processor, said specified restrictions to said user,
    wherein said visual sign comprises an indicator selected from the group consisting of a sign comprising text defining said restrictions, a sign comprising a visual indicator defining said restrictions, and a sign comprising text and a visual indicator defining said restrictions.

2. The method of claim 1, wherein said video retrieval apparatus comprises an apparatus selected from the group consisting of a camera and a streaming video retrieval device.

3. The method of claim 1, wherein said executing said GPS based process comprises:
    retrieving, from a GPS apparatus, GPS data defining said location associated with said user;
    determining, based on said GPS data, geographical attributes associated with said location associated with said user, wherein said location comprises a current location of said user;
    analyzing said restricted apparatus with respect to restrictions data associated with said geographical attributes; and
    locating, within said restrictions data, data defining said restricted apparatus with respect to said specified restrictions and said location.

4. The method of claim 3, wherein said geographical attributes comprise attributes selected for the group consisting of a country, a state, a county, a city, and a location type.

5. The method of claim 1, wherein said executing said GPS based process comprises:
    retrieving, from a GPS apparatus, GPS data defining said location associated with said user;
    determining, based on said GPS data, geographical attributes associated with said location associated with said user, wherein said location comprises a near-by location near to said user;
    analyzing said restricted apparatus with respect to restrictions data associated with said geographical attributes; and
    locating, within said restrictions data, data defining said restricted apparatus with respect to said specified restrictions and said location.

6. The method of claim 1, wherein said executing said GPS based process comprises:
    retrieving, from a GPS apparatus, GPS data defining a street address of said location associated with said user, wherein said location comprises a current location of said user;
    analyzing said restricted apparatus with respect to restrictions data associated with said street address of said location; and
    locating, within said restrictions data, data defining said restricted apparatus with respect to said specified restrictions and said street address.

7. The method of claim 1, wherein said determining that said user is in possession of said restricted apparatus comprises determining that said restricted apparatus comprises an apparatus that would trigger a search of said user.

8. The method of claim 1, wherein said determining that said user is in possession of said restricted apparatus comprises determining that said restricted apparatus comprises an apparatus that is powered on.

9. The method of claim 1, wherein said determining that said user is in possession of said restricted apparatus comprises determining that said restricted apparatus comprises an apparatus that is capable of being powered on.

10. The method of claim 1, further comprising:
    determining, by said computer processor, that said user is in possession of an additional restricted apparatus differing from said restricted apparatus, wherein said video based process and said GPS based process are executed with respect to said additional restricted apparatus, and wherein said specified restrictions are additionally associated with said additional restricted apparatus with respect to said location.

11. The method of claim 1, wherein said computer processor comprises a first computer processor and a second computer processor, wherein said first computer processor is comprised by said computing device, and wherein said second computer processor is comprised by an external computing system.

12. The method of claim 1, further comprising:
    providing at least one support service for at least one of creating, integrating, hosting, maintaining, and deploying computer-readable code in the computing system, said code being executed by the computer processor to implement: said determining that said user is in possession of said restricted apparatus, said executing said video based process, said executing said GPS based process, said determining said restrictions, and said presenting.

13. The method of claim 1, wherein said restricted apparatus comprises an RFID tag, and wherein said determining that said user is in position of said restricted apparatus comprises detecting said RFID tag.

14. The method of claim 1, wherein said specified restrictions comprise restrictions associated with protecting individuals from executing violations with respect to said restricted apparatus in accordance with federal, state, and county laws.

15. An eyewear based computing system comprising a computer processor coupled to a non-transitory computer-readable memory unit, said memory unit comprising instructions that when executed by the computer processor implements a method comprising:

determining, by said computer processor, that a user is in possession of a restricted apparatus restricted based on a specified geographical location, wherein said eyewear based computing system comprises an optical eyewear mounted display used by said user for displaying information and images to said user, and wherein said eyewear based computing system comprises a video retrieval apparatus and global positioning system (GPS) apparatus internal to said eyewear based computing system;

executing, by said computer processor via said video retrieval apparatus, a video based process associated with said restricted apparatus and a location associated with said user wherein said executing said video based process comprises:

determining that said video retrieval apparatus is enabled;

retrieving, from said video retrieval apparatus, video data associated with said location associated with said user, wherein said location comprises a current location of said user;

analyzing said video data; and generating, based on results of said analyzing, a visual indication specifying general restrictions associated with said location, wherein said visual indication is derived from a visual sign, at said location, presenting said general restrictions: executing, by said computer processor via said GPS apparatus, a GPS based process associated with said restricted apparatus and said location associated with said user;

determining, by said computer processor based on results of said video based process and said GPS based process, specified restrictions associated with said restricted apparatus with respect to said location associated with said user; and presenting, by said computer processor, said specified restrictions to said user, wherein said visual sign comprises an indicator selected from the group consisting of a sign comprising text defining said restrictions, a sign comprising a visual indicator defining said restrictions, and a sign comprising text and a visual indicator defining said restrictions.

16. The computing system of claim 15, wherein said video retrieval apparatus comprises an apparatus selected from the group consisting of a camera and a streaming video retrieval device.

17. A computer program product, comprising a non-transitory computer readable hardware storage device storing a computer readable program code, said computer readable program code comprising an algorithm that when executed by a computer processor of an eyewear based computing system implements a method, said method comprising:

determining, by said computer processor, that a user is in possession of a restricted apparatus restricted based on a specified geographical location, wherein said eyewear based computing system comprises an optical eyewear mounted display used by said user for displaying information and images to said user, and wherein said eyewear based computing system comprises a video retrieval apparatus and global positioning system (GPS) apparatus internal to said eyewear based computing system;

executing, by said computer processor via said video retrieval apparatus, a video based process associated with said restricted apparatus and a location associated with said user, wherein said executing said video based process comprises:

determining that said video retrieval apparatus is enabled;

retrieving, from said video retrieval apparatus, video data associated with said location associated with said user, wherein said location comprises a current location of said user;

analyzing said video data; and generating, based on results of said analyzing, a visual indication specifying general restrictions associated with said location, wherein said visual indication is derived from a visual sign, at said location, presenting said general restrictions; executing, by said computer processor via said GPS apparatus, a GPS based process associated with said restricted apparatus and said location associated with said user;

determining, by said computer processor based on results of said video based process and said GPS based process, specified restrictions associated with said restricted apparatus with respect to said location associated with said user; and presenting, by said computer processor, said specified restrictions to said user, wherein said visual sign comprises an indicator selected from the group consisting of a sign comprising text defining said restrictions, a sign comprising a visual indicator defining said restrictions, and a sign comprising text and a visual indicator defining said restrictions.

* * * * *